(12) United States Patent
Zhang

(10) Patent No.: US 11,093,421 B2
(45) Date of Patent: Aug. 17, 2021

(54) OPERATION DEVICE

(71) Applicant: Nuvoton Technology Corporation, Hsinchu Science Park (TW)

(72) Inventor: Yi-Qiao Zhang, New Taipei (TW)

(73) Assignee: NUVOTON TECHNOLOGY CORPORATION, Hsinchu Science Park (TW)

(*) Notice: Subject to any disclaimer, the term of this patent is extended or adjusted under 35 U.S.C. 154(b) by 0 days.

(21) Appl. No.: 16/731,620

(22) Filed: Dec. 31, 2019

(65) Prior Publication Data
US 2021/0042250 A1   Feb. 11, 2021

(30) Foreign Application Priority Data

Aug. 7, 2019 (TW) .................... 108127987

(51) Int. Cl.
*G06F 13/20* (2006.01)
*G06F 13/42* (2006.01)

(52) U.S. Cl.
CPC .......... *G06F 13/20* (2013.01); *G06F 13/4282* (2013.01); *G06F 2213/0016* (2013.01)

(58) Field of Classification Search
None
See application file for complete search history.

(56) References Cited

U.S. PATENT DOCUMENTS

| | | | | |
|---|---|---|---|---|
| 9,367,121 B2* | 6/2016 | Huang | ................... | G06F 1/3278 |
| 9,468,077 B2* | 10/2016 | Borsoi | ................ | H04L 27/2003 |
| 9,946,532 B2* | 4/2018 | Peng | ..................... | G06F 3/0482 |
| 2004/0143828 A1* | 7/2004 | Liu | ......................... | G06F 8/654 |
| | | | | 717/168 |
| 2004/0221067 A1* | 11/2004 | Huang | ................ | G06F 13/4045 |
| | | | | 710/1 |
| 2005/0013391 A1* | 1/2005 | Boer | ....................... | H04L 1/208 |
| | | | | 375/340 |
| 2014/0351474 A1* | 11/2014 | Chapman | ............ | H04M 1/0274 |
| | | | | 710/301 |

FOREIGN PATENT DOCUMENTS

| TW | 200841767 A | 10/2008 |
|---|---|---|
| TW | 201028030 A | 7/2010 |
| TW | 201037594 A | 10/2010 |

(Continued)

OTHER PUBLICATIONS

Office Action and Search Report issued in corresponding Taiwanese Application No. 108127987 dated Jul. 23, 2020.

*Primary Examiner* — Idriss N Alrobaye
*Assistant Examiner* — Dayton Lewis-Taylor
(74) *Attorney, Agent, or Firm* — Muncy, Geissler, Olds & Lowe, P.C.

(57) ABSTRACT

An operation device includes a transmission interface and a control circuit. The transmission interface is coupled to the bus. The control circuit outputs a switching command to the first slave device at the first transmission rate and via the transmission interface, to control the first slave device to operate in an update mode, and outputs update data to the first slave device at the second transmission rate and via the transmission interface, so as to update a program code of the first slave device. The second transmission rate is higher than the first transmission rate.

15 Claims, 5 Drawing Sheets

(56) References Cited

FOREIGN PATENT DOCUMENTS

| | | |
|---|---|---|
| TW | 201208484 A | 2/2012 |
| TW | 201306661 A | 2/2013 |
| TW | M456037 U | 6/2013 |
| TW | 201349775 A | 12/2013 |
| TW | 201500872 A | 1/2015 |
| TW | 201532478 A | 8/2015 |
| TW | 201540132 A | 10/2015 |
| TW | 201603636 A | 1/2016 |
| TW | 201739317 A | 11/2017 |
| TW | 201827745 A | 8/2018 |

\* cited by examiner

OPERATION DEVICE

CROSS-REFERENCE TO RELATED APPLICATION

This application claims the benefit of Taiwan Patent Application No. 108127987, filed on Aug. 7, 2019, in the Taiwan Intellectual Property Office, the disclosure of which is incorporated herein in its entirety by reference.

BACKGROUND OF THE INVENTION

1. Field of the Invention

The present invention relates to an operation device, more particularly to an operation device using different transmission rates to communicate with external devices.

2. Description of the Related Art

With the advancement of technology, types and functions of electronic products are increasing. Most of the electronic products are operated based on program code stored therein. In order to continuously provide better performance of electronic products, manufacturers of electronic products will provide update codes from time to time, to enable users to update their electronic products. In general, in order to load an update code into an electronic product, a user generally has to connect the electronic product to a computer, and then transmits the update code to the electronic product. However, when the electronic product is wrapped in a case, the user needs to remove the case of the electronic product first, and then connects the computer to a connection port reserved inside the electronic product. In addition, in order to connect with the computer, the electronic product needs to reserve the connection port, which wastes the usable space of the electronic product. Furthermore, when the number of electronic products to be updated is great, the user must spend a lot of time in performing the update operation.

SUMMARY OF THE INVENTION

An objective of the present invention is to provide an operation device, to solve above-mentioned problem.

In order to achieve the objective, the present invention provides an operation device including a transmission interface and a control circuit. The transmission interface is coupled to a bus. The control circuit outputs a switching command to a first slave device at the first transmission rate and via the transmission interface, to control the first slave device to operate in an update mode, and outputs update data to the first slave device at the second transmission rate and via the transmission interface, to update a program code of the first slave device. The second transmission rate is higher than the first transmission rate.

In order to achieve the objective, the present invention provides an operation device including a transmission interface and a control circuit. The transmission interface is coupled to the bus. The control circuit is operated in a normal mode or an update mode according to the switching command. In the normal mode, the control circuit receives the switching command at the first transmission rate and via the transmission interface, and in the update mode, the control circuit receives the update data at the second transmission rate and via the transmission interface. The second transmission rate is higher than the first transmission rate.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
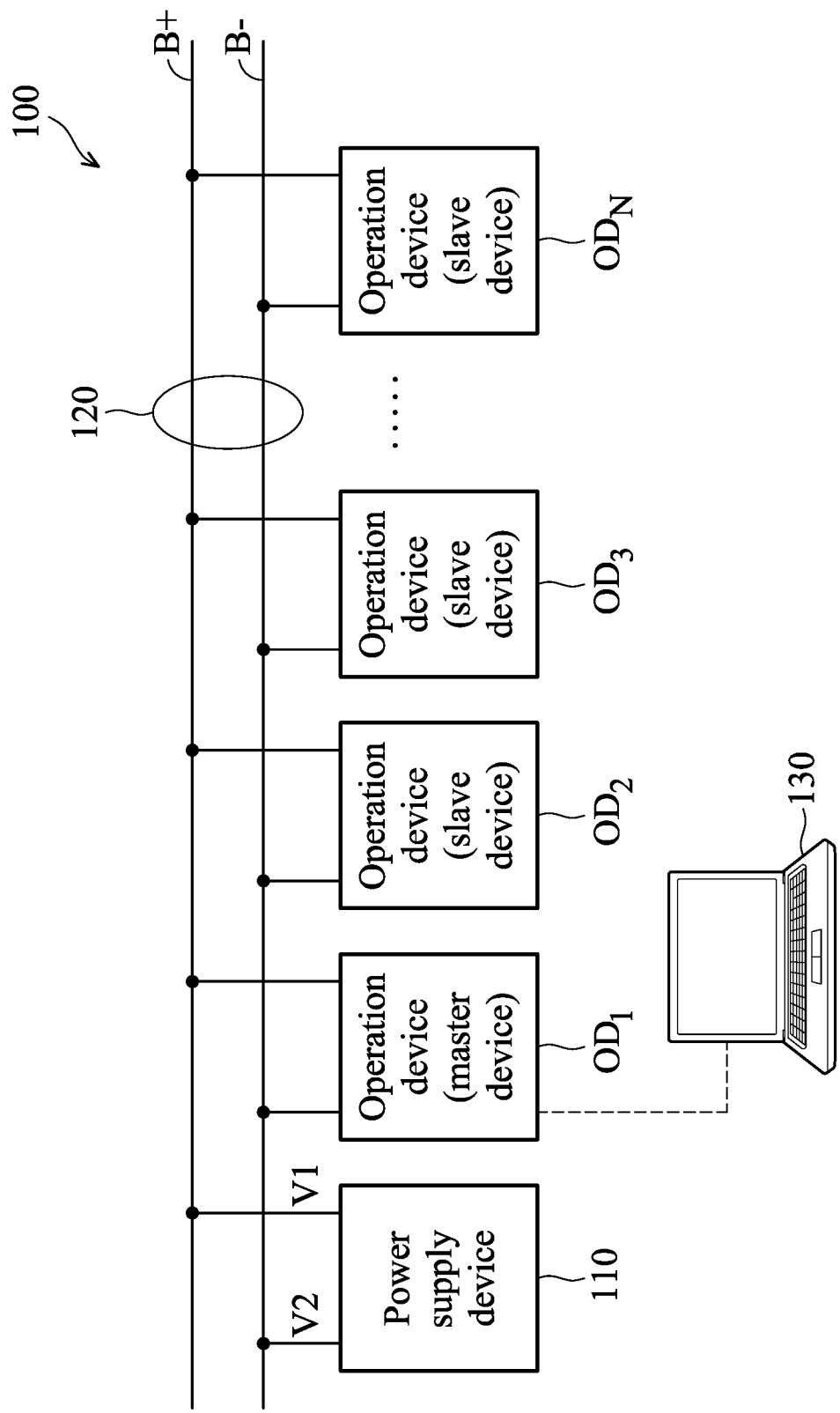
FIG. 1 is a schematic view of an operating system of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings can be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, can be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers can be present. In contrast, when an element is referred to as being "directly on," "directly connected to" or "directly coupled to" another element or layer, there are no intervening elements or layers present.

In addition, unless explicitly described to the contrary, the word "comprise", "include" and "have", and variations such as "comprises", "comprising", "includes", "including", "has" and "having" will be acknowledged to imply the inclusion of stated elements but not the exclusion of any other elements.

FIG. 1 is a schematic view of an operating system of the present invention. As shown in FIG. 1, the operating system 100 comprises a power supply device 110, a plurality of operation devices $OD_1$~$OD_N$ and a bus 120. The type of the operating system 100 of the present invention is not limited to the examples described herein. In an embodiment, the operating system 100 can be a digital addressable lighting interface (DALI) system, for example, the operating system 100 can be a lighting system of a building or an office.

The power supply device 110 can provide differential power to the bus 120. For example, the power supply device 110 can provide a voltage V1 to a transmission line B+ of the bus 120, and provides a voltage V2 to a transmission line B− of the bus 120; however, the values of the voltages V1 and V2 of the present invention are not limited to these examples, and in an embodiment, the voltage V1 can be higher than the voltage V2; for example, the voltage V1 can be about 16V, the voltage V2 can be about 0V.

The operation devices $OD_1$~$OD_N$ are coupled to the bus 120. In this embodiment, the operation device $OD_1$ is used as a master device configured to control the operation devices $OD_2$-$OD_N$. The operation devices $OD_2$-$OD_N$ are used as slave devices. In an embodiment, all of the operation devices $OD_2$-$OD_N$ are lighting devices. In this example, the operation device $OD_1$ can control brightness of the operation devices $OD_2$-$OD_N$ and update program codes of the operation devices $OD_2$-$OD_N$, respectively, via the bus 120.

In other embodiment, the operation device $OD_1$ is coupled to an electronic device 130. In this example, the user can give a command to the operation device $OD_1$ through an application of the electronic device 130, and the operation device $OD_1$ can control the operation devices $OD_2$~$OD_N$ according to the command given by the user. For example, the user can request, via the electronic device 130, the operation device $OD_1$ to change the brightness of at least one of the operation devices $OD_2$~$OD_N$, or request the operation device $OD_1$ to capture states of the operation devices $OD_2$~$OD_N$.

In some embodiments, the user can request, via the electronic device 130, the operation device $OD_1$ to update a program code of at least one of the operation devices $OD_2$~$OD_N$. In this example, the operation device $OD_1$ sends a switching command at a first transmission rate, to control the at least one specific operation device of the operation devices $OD_2$~$OD_N$ to enter an update mode, and the operation device $OD_1$ then transmits update data at a second transmission rate. At this time, only the specific operation device, operating in the update mode, can receive the update data and then update the program code thereof according to the received update data. After the specific operation device is updated completely, the operation device $OD_1$ can control, at a first transmission rate, the specific operation device to leave from the update mode and enter the normal mode. In the normal mode, the operation devices $OD_2$~$OD_N$ are operated according to the program codes thereof.

Since the user can update the plurality of specific operation devices by using the operation device $OD_1$, it is not necessary to connect the electronic device 130 to each of the plurality of specific operation devices one-to-one, so that the speed of the update operation can be improved. Furthermore, the user does not need to remove or open the case of the specific operation device to connect the electronic device 130 to the connection port reserved inside the specific operation device, thereby simplifying the update step.

The type of the electronic device 130 of the present invention is not limited to the examples described herein. In an embodiment, the electronic device 130 can be a portable electronic device, such as a notebook or a smartphone. In some embodiments, the operation device $OD_1$ can have a USB port, not shown in FIG. 1, configured to be coupled to the electronic device 130. In other embodiment, the operation device $OD_1$ comprises an insertion slot, not shown in FIG. 1, configured for insertion of the memory card, such as an SD card. The operation device $OD_1$ can control the operation devices $OD_2$~$OD_N$ according to the program code stored in the memory card. In an embodiment, the operation device $OD_1$ comprises a plurality of buttons, not shown in FIG. 1. The user can operate the buttons to control the operation device $OD_1$ to read and execute the program code stored in the memory card. In this example, the operation device $OD_1$ can update at least one of the operation devices $OD_2$~$OD_N$ according to the program code stored in the memory card.

The bus 120 comprises transmission lines B+ and B−. In this embodiment, signals of the transmission line B+ and B− form a differential signal pair. In an embodiment, the bus 120 can be a digital addressable lighting interface (DALI) bus.

Figure 2A:
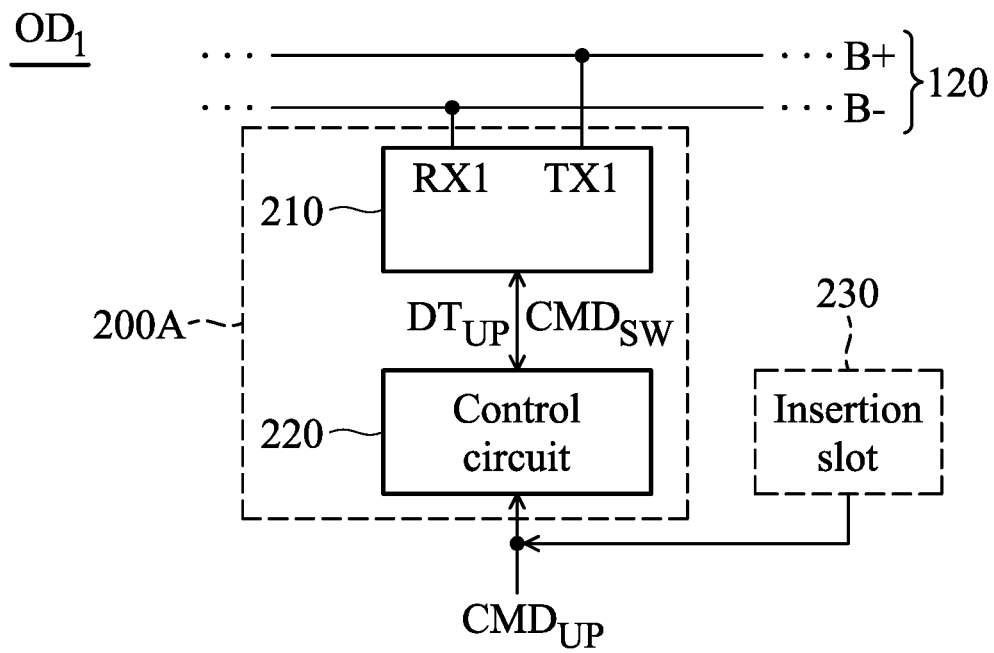
FIG. 2A is a schematic architecture view of an embodiment of a master device of the present invention.

FIG. 2A is a schematic architecture view of an embodiment of an operation device $OD_1$ of the present invention. As shown in FIG. 2A, the operation device $OD_1$ comprises a microcontroller 200A. In this embodiment, the microcontroller 200A comprises a transmission interface 210 and a control circuit 220, but the present invention is not limited to the above-mentioned examples. For convenience in explanation, FIG. 2A only shows the circuit architecture most related to the present invention. In other embodiment, the microcontroller 200A can include other hardware devices, such as a memory, a processor and a controller.

The transmission interface 210 is coupled to the bus 120. In this embodiment, the transmission interface 210 comprises a pin TX1 which is configured to output a switching command $CMD_{SW}$ and update data $DT_{UP}$ to the transmission line B+ of the bus 120. In other embodiment, the transmission interface 210 comprises a pin RX1 which is configured to receive a message from the transmission line B− of the bus 120. The type of the transmission interface 210 of the present invention is not limited to the examples described herein. In an embodiment, the transmission interface 210 can be a general-purpose input-output (GPIO) interface. In some embodiments, when the pin TX1 transmits the switching command $CMD_{SW}$ and the update data $DT_{UP}$, the pin RX1 can be maintained at a low voltage level.

The control circuit 220 can generate the switching command $CMD_{SW}$ and the update data $DT_{UP}$ according to an update command $CMD_{UP}$. The source of the update command $CMD_{UP}$ is not limited in the present invention, for example, in an embodiment, the update command $CMD_{UP}$ can be from an electronic device, such as the electronic device 130. In this example, the user outputs the update command $CMD_{UP}$ through the electronic device, to request the operation device $OD_1$ to update at least one of the operation devices $OD_2$~$OD_N$.

In another embodiment, the update command $CMD_{UP}$ can be from a storage medium, such as a SD card. In this example, the operation device $OD_1$ comprises an insertion slot 230. When the storage medium having the update command is inserted into the insertion slot 230, the control circuit 220 can read and execute the program code stored in the storage medium, so as to generate the switching command $CMD_{SW}$ and the update data $DT_{UP}$.

The switching command $CMD_{SW}$ is used to switch the operation modes of the operation devices $OD_2 \sim OD_N$. In an embodiment, the switching command $CMD_{SW}$ comprises short address information configured to change the operation mode of the specific operation device. In a condition that the operation devices $OD_2 \sim OD_N$ are operated in the normal mode, when the switching command $CMD_{SW}$ is directed to the operation device $OD_2$, the operation device $OD_2$ leaves from the normal mode and enters the update mode, and the operation devices $OD_3 \sim OD_N$ stay in the normal mode. In this example, when the switching command $CMD_{SW}$ is directed to the operation device $OD_2$ again, the operation device $OD_2$ leaves from the update mode and returns to the normal mode. On the contrary, when the switching command $CMD_{SW}$ is directed to the operation device $OD_3$, the operation device $OD_3$ leaves from the normal mode and enter the update mode; at this time, the operation device $OD_2$ stays in the update mode, and the operation devices $OD_4 \sim OD_N$ maintain in the normal mode.

In another embodiment, the switching command $CMD_{SW}$ comprises group address information which is configured to change the operation modes of the plurality of operation devices. For example, in a condition that the operation devices $OD_2 \sim OD_N$ are operated in the normal mode, and when the switching command $CMD_{SW}$ is directed to the operation devices $OD_2 \sim OD_{15}$, the operation devices $OD_2$-$OD_{15}$ leave from the normal mode and enter the update mode, the operation devices $OD_{16} \sim OD_N$ stay in the normal mode. In this example, when the operation devices $OD_2 \sim OD_N$ receive the switching command $CMD_{SW}$ again and the switching command $CMD_{SW}$ assigns at least one of the operation devices $OD_2$-$OD_{15}$, the assigned operation device of the operation devices $OD_2$-$OD_{15}$ leaves from the update mode and enters the normal mode. Similarly, when the switching command $CMD_{SW}$ assigns at least one of the operation devices $OD_{16}$ to $OD_N$, the assigned operation device leaves from the normal mode and enters the update mode.

In some embodiments, the switching command $CMD_{SW}$ comprises the broadcast information, configured to direct to all operation devices. For example, it is assumed that, the operation devices $OD_2 \sim OD_N$ are operated in the normal mode. When the operation devices $OD_2 \sim OD_N$ receive the switching command $CMD_{SW}$, and when the switching command $CMD_{SW}$ comprises the broadcast information, the operation device $OD_2$ to $OD_N$ leave from the normal mode, and enter the update mode.

The update data $DT_{UP}$ can be used to update the program codes of the operation devices $OD_2 \sim OD_N$. When at least one specific operation device of the operation devices $OD_2 \sim OD_N$ is operated in the update mode, the specific operation device can perform an update operation according to the update data $DT_{UP}$. During the update operation, the original program code of the specific operation device can be replaced by the update data $DT_{UP}$. For example, in a condition that the operation device $OD_2$ is operated in the update mode according to the switching command $CMD_{SW}$, and the operation devices $OD_3 \sim OD_N$ are operated in the normal mode, only the program code of the operation device $OD_2$ is replaced by the update data $DT_{UP}$, and the program codes of the operation devices $OD_3 \sim OD_N$ are not changed.

In another embodiment, when the operation devices $OD_2$-$OD_{15}$ are operated in the update mode, and the operation devices $OD_{16} \sim OD_N$ are operated in the normal mode, the operation devices $OD_2 \sim OD_{15}$ perform the update operations, and the operation devices $OD_{16} \sim OD_N$ do not perform the update operation. In other embodiment, when all of the operation devices $OD_2 \sim OD_N$ are operated in the update mode, the operation devices $OD_2 \sim OD_N$ execute the update operation.

In this embodiment, the control circuit 220 outputs, at the first transmission rate, the switching command $CMD_{SW}$ to the at least one specific operation device of the operation devices $OD_2 \sim OD_N$ via the transmission interface 210, so as to control the specific operation device to operate in the update mode. The control circuit 220 can output, at the second transmission rate, the update data $DT_{up}$ via the transmission interface 210, to the specific operation device, so as to update the program code of the specific operation device. After the program code of the specific operation device is updated, the control circuit 220 outputs, at the first transmission rate again, the switching command $CMD_{SW}$ via the transmission interface 210, to control the specific operation device to leave from the update mode and enter the normal mode. In the normal mode, the specific operation device is operated according to the updated program code. The second transmission rate is higher than the first transmission rate. The values of the first transmission rate and the second transmission rate are not limited in the present invention. In an embodiment, the first transmission rate can be about 1200 bps, and the second transmission rate can be about 12000 bps; however, the present invention is not limited to above-mentioned examples.

In other embodiment, when the control circuit 220 wants to update the program code of the operation devices $OD_2$ and $OD_3$, the control circuit 220 can update the program code of the operation device $OD_2$ first, and then update the program code of the operation device $OD_3$. For example, the control circuit 220 can output, at the first transmission rate, the switching command $CMD_{SW}$ to control the operation device $OD_2$ to operate in the update mode. In this example, the operation device $OD_3$ stays in the normal mode. Next, the control circuit 220 can output, at the second transmission rate, the update data $DT_{UP}$. At this time, since the operation device $OD_2$ is operated in the update mode, the operation device $OD_2$ can receive the update data $DT_{up}$ and update the program code thereof according to the update data $DT_{UP}$. After the update operation is completed, the operation device $OD_2$ can send a completion reply. The control circuit 220 receives the completion reply at the second transmission rate via the pin RX, and then outputs, at the first transmission rate, the switching command $CMD_{SW}$ to control the operation device $OD_2$ to return to the normal mode. Next, the control circuit 220 outputs again, at the first transmission rate, the switching command $CMD_{SW}$ to control the operation device $OD_3$ to enter the update mode; at the same time, the operation device $OD_2$ stays in the normal mode. The control circuit 220 can output, at the second transmission rate, the update data $DT_{up}$; at this time, since the operation device $OD_3$ is operated in the update mode, the operation device $OD_3$ receives the update data $DT_{UP}$, and updates the program code thereof according to the update data $DT_{UP}$. After the update operation is completed, the operation device $OD_3$ can send a completion reply. After receiving the completion reply at the second transmission rate and via the pin RX, the control circuit 220 can output, at the first transmission rate, the switching command $CMD_{SW}$ to control the operation device $OD_3$ to return to the normal mode.

In another embodiment, the control circuit 220 can send, at the first transmission rate, the switching command $CMD_{SW}$ carrying the group address information, to control the operation devices $OD_2$ and $OD_3$ to enter the update mode. Next, the control circuit 220 can output, at the second transmission rate, the update data $DT_{UP}$; since the operation devices $OD_2$ and $OD_3$ are operated in the update mode, the operation devices $OD_2$ and $OD_3$ can perform the update operation according to the update data $DT_{UP}$. After the update operations are completed, each of the operation devices $OD_2$ and $OD_3$ can generate a checksum. The control circuit 220 can receive, at the second transmission rate, the checksums of the operation devices $OD_2$ and $OD_3$, and determine whether each of the checksums of the operation devices $OD_2$ and $OD_3$ matches a preset value. When each of the checksums of the operation devices $OD_2$ and $OD_3$ matches the preset value, it indicates that the operation devices $OD_2$ and $OD_3$ complete the update operations already. Next, the control circuit 220 can output, at the first transmission rate, the switching command $CMD_{SW}$, which carries the group address information, to control the operation devices $OD_2$ and $OD_3$ to return to the normal mode.

Figure 2B:
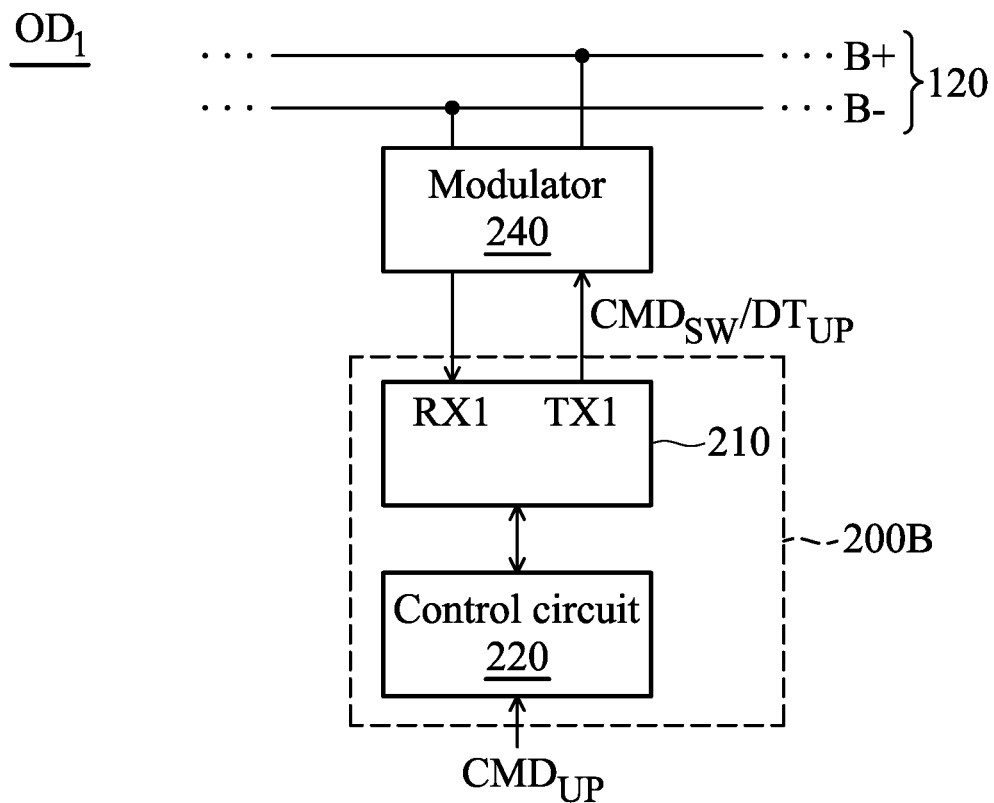
FIG. 2B is a schematic architecture view of another embodiment of a master device of the present invention.

FIG. 2B is a schematic architecture view of another embodiment of an operation device $OD_1$ of the present invention. FIG. 2B is similar to FIG. 2A, and the difference between the embodiment of FIG. 2A and the embodiment of FIG. 2B is that the embodiment of FIG. 2B includes a modulator 240 and does not include the insertion slot 230. The modulator 240 is coupled between the transmission interface 210 and the bus 120, and configured to convert the signal of the pin TX1 of the transmission interface 210, so as to generate a signal which is appropriate to be transmitted on the bus 120. For example, the modulator 240 can increase voltage levels of the switching command $CMD_{SW}$ and the update data $DT_{up}$, for example, increase the voltage levels from 5V to 16V. In this example, since the switching command $CMD_{SW}$ and the update data $DT_{UP}$ have higher voltages, the switching command $CMD_{SW}$ and the update data $DT_{UP}$ can be transmitted to farther slave device without being interfered or distorted easily. The type of the modulator 240 of the present invention is not limited to the examples described herein. In an embodiment, the modulator 240 can be a DALI modulator. In other embodiment, the modulator 240 can be integrated into the microcontroller 200B.

Figure 3A:
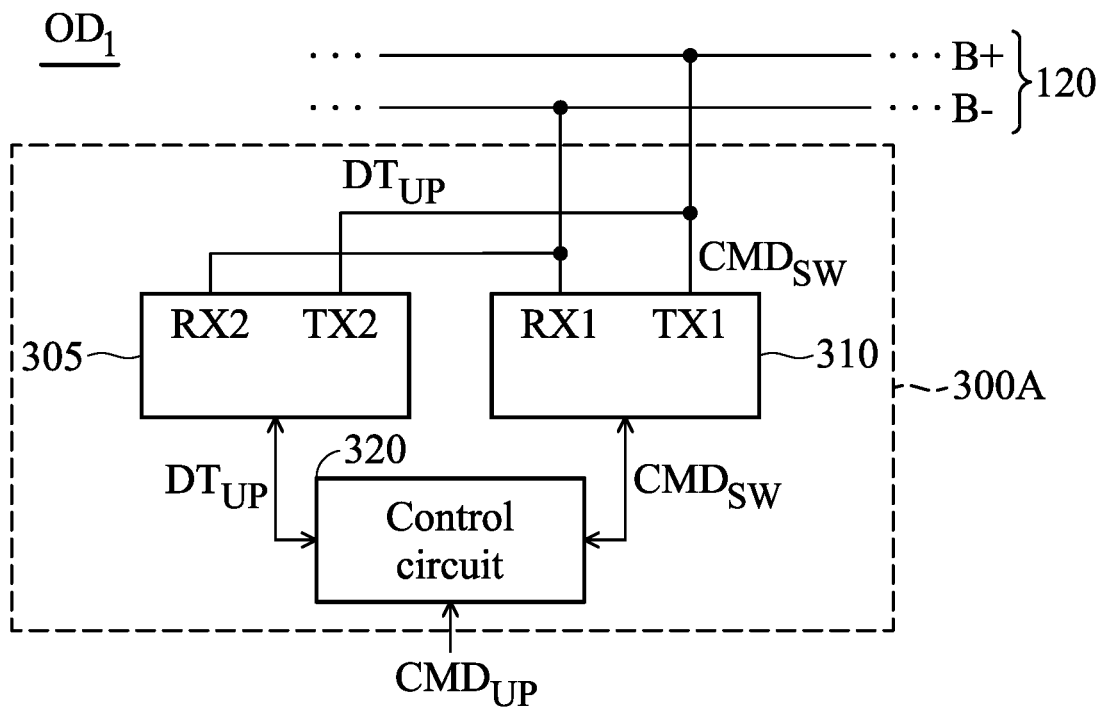
FIG. 3A is a schematic architecture view of another embodiment of a master device of the present invention.

FIG. 3A is a schematic architecture view of another embodiment of an operation device $OD_1$ of the present invention. The operation device $OD_1$ comprises transmission interfaces 305 and 310, and a control circuit 320. In this embodiment, the transmission interfaces 305 and 310, the control circuit 320 can be integrated in the microcontroller 300A.

The transmission interface 310 comprises pins TX1 and RX1. The pin TX1 is coupled to the transmission line B+ of the bus 120 and configured to transmit the switching command $CMD_{SW}$ to the transmission line B+. The pin RX1 is coupled to the transmission line B− of the bus 120 and configured to receive the message from the transmission line B−. In an embodiment, the transmission interface 310 can be a general-purpose input-output (GPIO) interface.

The transmission interface 305 comprises pins TX2 and RX2. The pin TX2 is coupled to the transmission line B+ of the bus 120 and configured to transmit the update data $DT_{UP}$ to the transmission line B+. The pin RX2 is coupled to the transmission line B− of the bus 120 and configured to receive a message from the transmission line B−. In this embodiment, the transmission interface 305 is used to transmit the update data $DT_{up}$ at a high speed. In an embodiment, the transmission interface 305 can be a serial transmission interface, for example, an I2C bus. In other embodiment, the transmission interface 305 comprises a UART.

The control circuit 320 can generate the switching command $CMD_{SW}$ and the update data $DT_{up}$ according to the update command $CMD_{UP}$. Since the characteristic of the control circuit 320 is similar to that of the control circuit 220 of FIG. 2A, the detailed description is not repeated herein. In this embodiment, the control circuit 320 can output the switching command $CMD_{SW}$ at the first transmission rate and via the transmission interface 310, and output the update data $DT_{UP}$ at the second transmission rate and via the transmission interface 305.

Figure 3B:
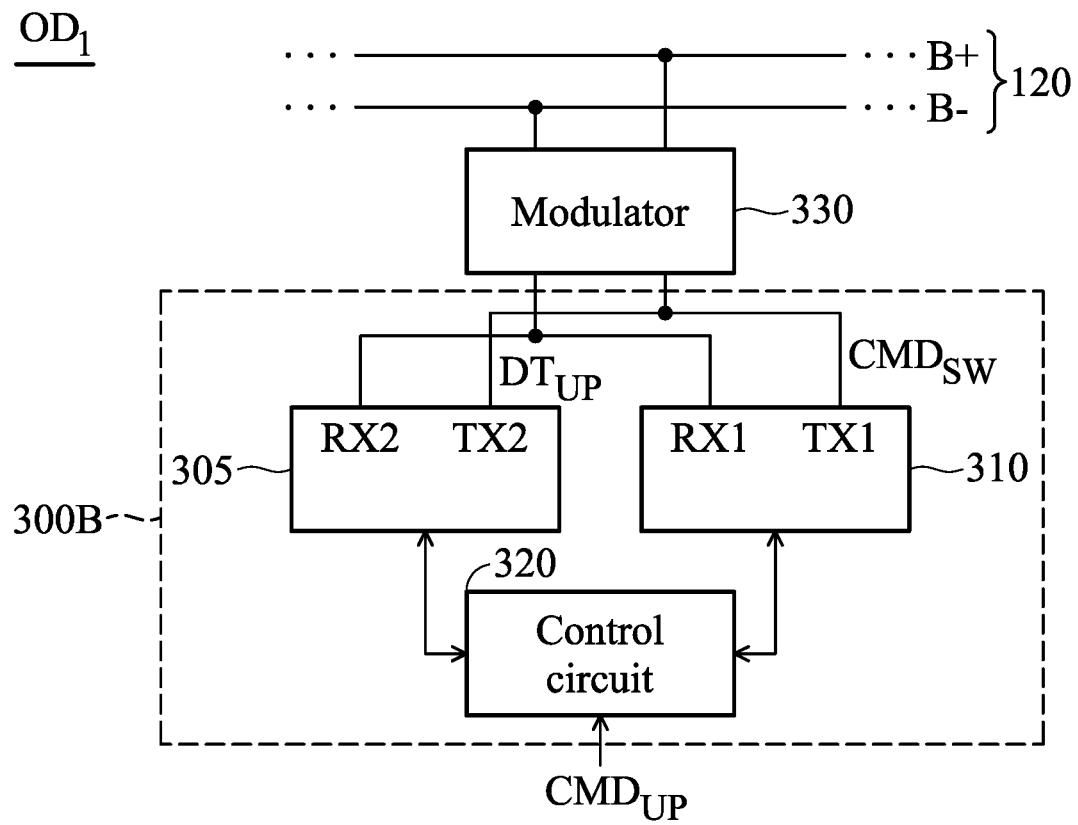
FIG. 3B is a schematic architecture view of another embodiment of a master device of the present invention.

FIG. 3B is a schematic architecture view of another embodiment of an operation device $OD_1$ of the present invention. FIG. 3B is similar to FIG. 3A, and the difference between the embodiment of FIG. 3A and the embodiment of FIG. 3B is that the operation device $OD_1$ of the embodiment of FIG. 3B includes a modulator 330 additionally. In this embodiment, the modulator 330 is independent from the microcontroller 300B, but the present invention is not limited to this example. In other embodiment, the modulator 330 can be integrated in the microcontroller 300B.

The modulator 330 is coupled between the transmission interfaces 305 and 310, and the bus 120, and configured to convert the signal, such as the switching command $CMD_{SW}$, of the transmission interface 310, and the signal, such as the update data $DT_{UP}$, of the transmission interface 305, so as to generate a waveform appropriate to be transmitted on the bus 120. Since the characteristic of the modulator 330 is similar to that of the modulator 240 of FIG. 2B, the detailed description is not repeated herein.

The operation device $OD_1$ switches the operation modes of the external slave devices, such as the operation devices $OD_2$~$OD_N$, through the switching command $CMD_{SW}$, so as to control the specific operation device to enter the update mode, and then provides the update data $DT_{up}$ at a higher transmission rate, so that the specific operation device can be updated quickly and the update efficiency can be increased. Furthermore, the user can just use the operation device $OD_1$ to update the operation devices $OD_2$~$OD_N$, so that convenience of the update operation is improved.

Figure 4A:
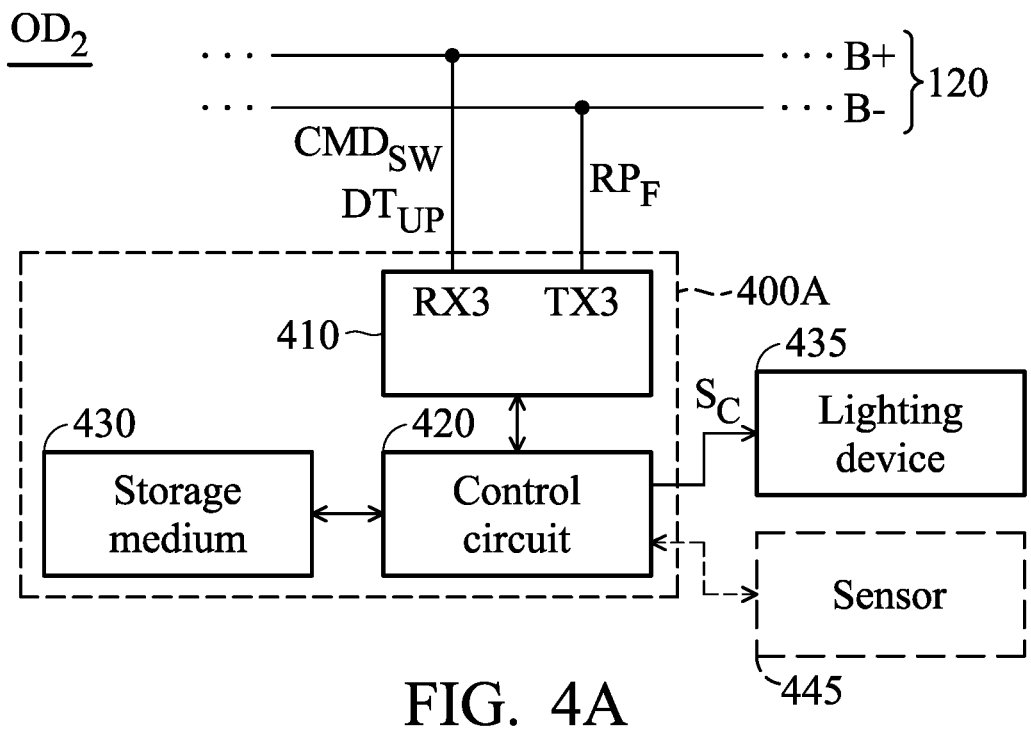
FIG. 4A is a schematic view of an embodiment of a slave device of the present invention.

The circuit architectures of slave devices, such as operation devices $OD_2$~$OD_N$, will be described with reference to FIGS. 4A, 4B, 5A and 5B in the following paragraphs. Since the circuit architectures of the operation device $OD_2$ to $OD_N$ are the same, the operation device $OD_2$ is taken as an example for illustration. FIG. 4A is a schematic view of an embodiment of the operation device $OD_2$ of the present invention. As shown in FIG. 4A, the operation device $OD_2$ comprises a transmission interface 410 and a control circuit 420. In an embodiment, the transmission interface 410 and the control circuit 420 can be integrated in the microcontroller 400A.

The transmission interface 410 comprises the pins TX3 and RX3. The pin TX3 is coupled to the transmission line B− of the bus 120 and configured to provide a message (such as a completion reply $RP_F$) to the transmission line B−. According to the message on the transmission line B−, the operation device $OD_1$ can obtain the state of the operation device $OD_2$, such as brightness, temperature or update process. The pin RX3 is coupled to the transmission line B+ of the bus 120 and configured to receive the switching command $CMD_{SW}$ and the update data $DT_{UP}$. In an embodiment, the transmission interface 410 can be a GPIO interface.

The operation mode of the control circuit 420 can be changed according to the switching command $CMD_{SW}$, for example, the control circuit 420 can leave from the normal mode and enter the update mode, or can leave from the update mode and enter the normal mode. In the normal mode, the control circuit 420 receives the external command, including the switching command $CMD_{SW}$, at the first transmission rate and via the transmission interface 410; in the update mode, the control circuit 420 receives the update data $DT_{UP}$ at the second transmission rate and via the transmission interface 410. The second transmission rate is higher than the first transmission rate.

In an embodiment, the microcontroller 400A comprises a storage medium 430 configured to store the program code. In the normal mode, the control circuit 420 reads and executes the program code stored in the storage medium 430. In the update mode, the control circuit 420 updates the program code in the storage medium 430, according to the update data $DT_{UP}$. When the control circuit 420 enters the normal mode, the control circuit 420 is operated according to the updated program code. Therefore, the operation device $OD_2$ does not need a connection port to couple an external electronic device, such as the electronic device 130.

The type of the storage medium 430 of the present invention is not limited to the examples described herein. In an embodiment, the storage medium 430 can be a programmable read-only memory (PROM). In this example, the control circuit 420 can directly program the program code of the storage medium 430, so that it does not need the operations of replacing the storage medium 430, detaching the storage medium 430, using a compiler to update the program code of the storage medium 430, and inserting the storage medium 430 back the operation device $OD_2$. In some embodiments, the storage medium 430 can be disposed outside the microcontroller 400A.

After the update operation is completed, the control circuit 420 generates and outputs a completion reply $RP_F$ to the transmission line B− at the second transmission rate. In other embodiment, the completion reply $RP_F$ can be a checksum. The external master device, such as the operation device $OD_1$, can determine, according to the checksum, whether the operation device $OD_2$ completes the update operation already. For example, when the checksum matches the preset value, it indicates that the operation device $OD_2$ is updated completely already. The master device can output the switching command $CMD_{SW}$ at the first transmission rate, to control the control circuit 420 to enter the normal mode.

In other embodiment, the operation device $OD_2$ can comprise a lighting device 435. The lighting device 435 can have at least one lamp tube. In this example, the control circuit 420 executes the program code stored in the storage medium 430, to generate a control signal $S_C$. The lighting device 435 can be operated according to the control signal $S_C$.

In some embodiments, the operation device $OD_2$ comprises a sensor 445. In some embodiments, the control circuit 420 can request, according to a query command (not shown in figures) received by the transmission interface 410, the sensor 445 to detect and reply the state of the lighting device 435, such as brightness or temperature of the lamp tube. In this example, the control circuit 420 can output a detection result of the sensor 445 to the bus 120 via the pin TX3 of the transmission interface 410.

In other implementations, the operation device $OD_2$ can include the sensor 445 only, and does not include the lighting device 435. In this example, the control circuit 420 can request, according to the query command (not shown in figure) received by the transmission interface 410, the sensor 445 to detect the state of the ambient environment, for example, the brightness or temperature of the ambient environment of the operation device $OD_2$, and output the detection result to the bus 120 via the pin TX3 of the transmission interface 410.

Figure 4B:
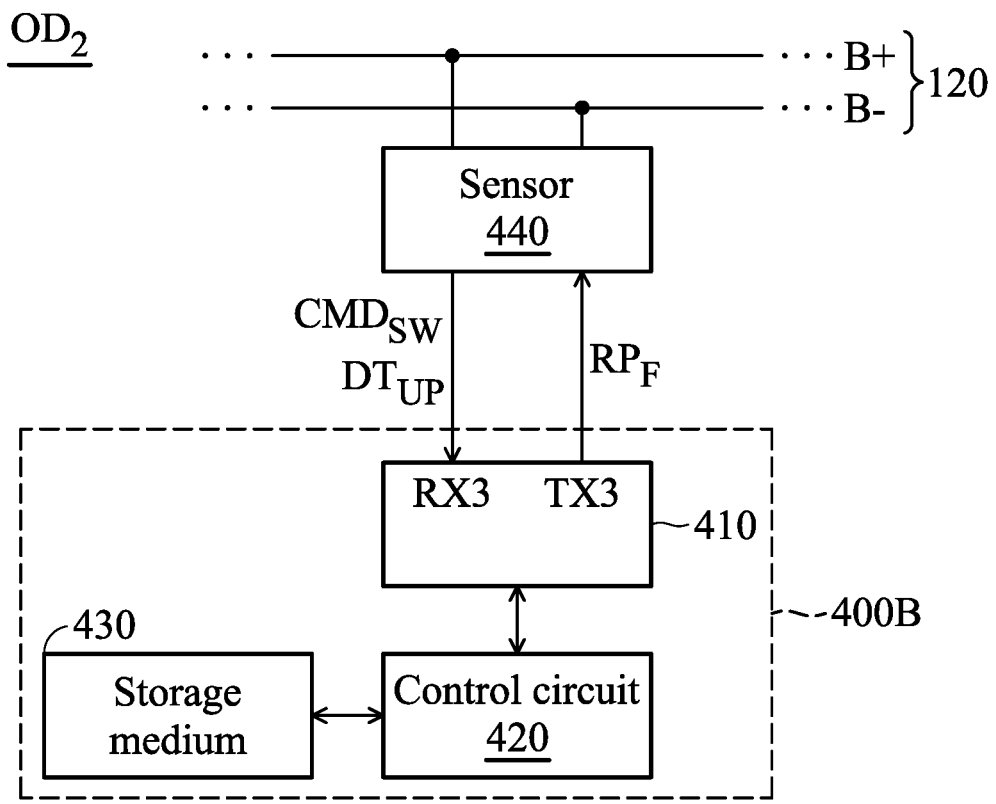
FIG. 4B is a schematic architecture view of another embodiment of a slave device of the present invention.

FIG. 4B is a schematic view of another embodiment of the operation device $OD_2$ of the present invention. FIG. 4B is similar to FIG. 4A, and the difference between the embodiment of FIG. 4A and the embodiment of FIG. 4B is that the embodiment of FIG. 4B includes a modulator 440 and does not include the lighting device 435 and the sensor 445. In other embodiment, at least one of the lighting device 435 and the sensor 445 of FIG. 4A can be applied to the operation device $OD_2$ of FIG. 4B.

In an embodiment, the modulator 440 can be integrated in the microcontroller 400B. In this embodiment, the modulator 440 is coupled between the bus 120 and the transmission interface 410, and can convert signal on the transmission line B+, to generate and output the switching command $CMD_{SW}$ and the update data $DT_{UP}$ to the pin RX3 of the transmission interface 410. For example, the modulator 440 can lower the voltage level of the transmission line B+. In another embodiment, the modulator 440 can convert the signal on the pin TX3, such as the completion reply $RP_F$, to generate the signal appropriate to be transmitted on the bus 120. For example, the modulator 440 can rise the voltage level of the completion reply $RP_F$.

Figure 5A:
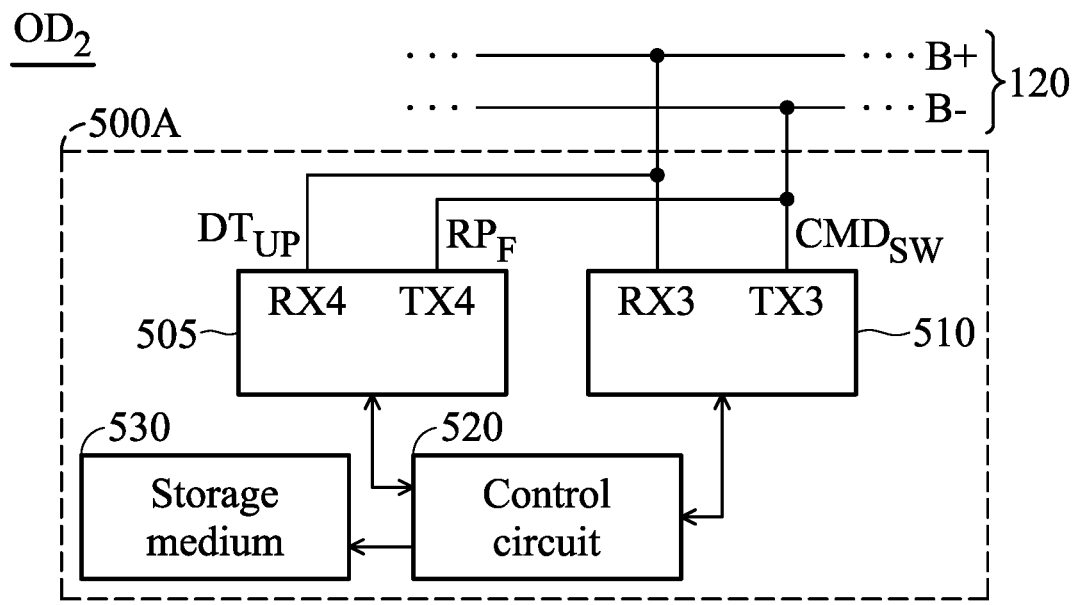
FIG. 5A is a schematic architecture view of another embodiment of a slave device of the present invention.

FIG. 5A is a schematic view of another embodiment of the operation device $OD_2$ of the present invention. As shown in FIG. 5A, the operation device $OD_2$ comprises transmission interfaces 505 and 510, a control circuit 520, and a storage medium 530. In this embodiment, the transmission interfaces 505 and 510, the control circuit 520, and the storage medium 530 can be integrated in the microcontroller 500A; however, the present invention is not limited to above-mentioned examples. In other embodiment, the storage medium 530 can be independent of the microcontroller 500A.

The transmission interface 510 comprises the pins TX3 and RX3. The pin TX3 is coupled to the transmission line B− of the bus 120 and configured to transmit message to the transmission line B−. The pin RX3 is coupled to the transmission line B+ of the bus 120 and configured to receive the switching command $CMD_{SW}$. In this embodiment, the transmission interface 510 can transmit command or message at the first transmission rate. In other embodiment, the transmission interface 510 can be a general-purpose input-output (GPIO) interface.

The transmission interface 505 comprises the pins TX4 and RX4. The pin TX4 is coupled to the transmission line B− of the bus 120 and configured to output the completion reply $RP_F$ to the transmission line B−. The pin RX4 is coupled to the transmission line B+ and configured to receive the update data $DT_{UP}$. In this embodiment, the transmission interface 505 can transmit message between the bus 120 and the control circuit 520 at the second transmission rate. In an embodiment, the transmission interface 505 can be a serial transmission interface, such as an I2C bus. In other embodiment, the transmission interface 310 can comprise a UART.

The control circuit 520 can receive the switching command $CMD_{SW}$ at the first transmission rate, and change the operation mode thereof according to the switching command $CMD_{SW}$, for example, leave from the normal mode and enter the update mode; at this time, the switching command CMD$_{SW}$ also enters the pin RX4, but the control circuit 520 ignores the change of the voltage level of the pin RX4. In the update mode, the control circuit 520 receives the update data DT$_{UP}$ the second transmission rate, and updates the program code of the storage medium 530 according to the update data DT$_{UP}$; at this time, the update data DT$_{UP}$ enters the pin RX3, but the control circuit 520 ignores the change of the voltage level of the pin RX3. After the update operation is completed, the control circuit 520 generates and outputs the completion reply RP$_F$ at the second transmission rate and via the pin TX4. Since the characteristic of the control circuit 520 is similar to that of the control circuit 420 of FIG. 2A, detailed description is not repeated herein. In other embodiment, at least one of the lighting device 435 and the sensor 445 of FIG. 4A can be applied to the operation device OD$_2$ of FIG. 5A.

Figure 5B:
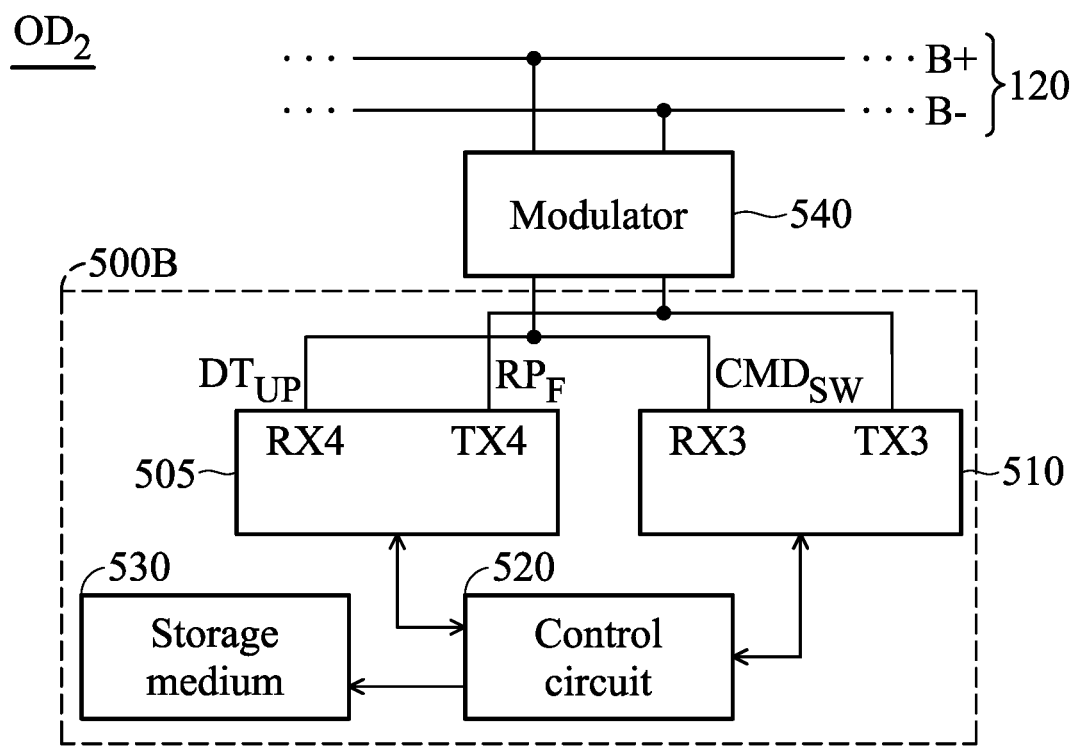
FIG. 5B is a schematic architecture view of another embodiment of a slave device of the present invention.

FIG. 5B is a schematic view of another embodiment of the operation device OD$_2$ of the present invention. FIG. 5B is similar to FIG. 5A, and the difference between the embodiment of FIG. 5A and the embodiment of FIG. 5B is that the embodiment of FIG. 5B includes a modulator 540 additionally. In other embodiment, at least one of the lighting device 435 and the sensor 445 of FIG. 4A can be applied to the operation device OD$_2$ of FIG. 5B.

In this embodiment, the modulator 540 is independent of the microcontroller 500B, but the present invention is not limited to above-mentioned examples. In other embodiment, the modulator 540 can be integrated in the microcontroller 500B. The modulator 540 is coupled between the bus 120 and the transmission interfaces 505 and 510. In this embodiment, the modulator 540 converts signal on the transmission line B+ and configured to generate and output the switching command CMD$_{SW}$ to the pin RX3 of the transmission interface 510, and generate and output the update data DT$_{UP}$ to the pin RX4 of the transmission interface 505. In an embodiment, the modulator 540 can lower the voltage level of the transmission line B+. In other embodiment, the modulator 440 further converts signal on the pins TX3 and TX4, to generate the signal appropriate to be transmitted on the bus 120. For example, the modulator 440 can rise the voltage level on the pins TX3 and TX4.

The operation device OD$_2$ can operate according to the command on the bus 120, for example, can adjust brightness or report brightness thereof, and also can update the program code thereof according to the update data DT$_{UP}$ on the bus 120, so that the operation device OD$_2$ does not need to include a connection port for receiving an update code from an electronic device, such as the electronic device 130. As a result, update efficiency can be significantly improved.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An operation device, comprising:
a transmission interface coupled to a bus; and
a control circuit configured to output a switching command to a first slave device at a first transmission rate and via the transmission interface, to control the first slave device to operate in an update mode, and output update data to the first slave device at a second transmission rate and via the transmission interface, to update a program code of the first slave device,
wherein the second transmission rate is higher than the first transmission rate, and
wherein:
the control circuit outputs the switching command to a second slave device at the first transmission rate and via the transmission interface, to control the second slave device to operate in the update mode, and outputs the update data to the second slave device at the second transmission rate and via the transmission interface, to update the program code of the second slave device,
the control circuit receives, at the second transmission rate, a first checksum provided by the first slave device and a second checksum provided by the second slave device, and
responsive to each of the first checksum and the second checksum matching a preset value, the control circuit outputs the switching command to the first slave device and the second slave device at the first transmission rate and via the transmission interface, so as to control the first slave device and the second slave device to operate in a normal mode.

2. The operation device according to claim 1, wherein responsive to the first slave device being updated completely, the control circuit outputs the switching command to the first slave device at the first transmission rate and via the transmission interface, to control the first slave device to operate in the normal mode, and in the normal mode, the first slave device is operated according to the program code.

3. The operation device according to claim 1, wherein the transmission interface is a general-purpose input-output (GPIO) interface, and comprises a first pin configured to transmit the switching command and the update data.

4. The operation device according to claim 1, wherein the transmission interface comprises:
a general-purpose input-output (GPIO) interface comprising a first pin configured to transmit the switching command; and
a serial transmission interface comprising a second pin configured to transmit the update data.

5. The operation device according to claim 4, wherein the serial transmission interface comprises a UART.

6. The operation device according to claim 4, wherein the serial transmission interface is an inter-integrated circuit (I2C) bus.

7. The operation device according to claim 1, wherein the bus is a digital addressable lighting interface (DALI) bus.

8. The operation device according to claim 1, further comprising:
a modulator coupled between the transmission interface and the bus, and configured to convert a signal of the transmission interface, to generate an output signal to the bus.

9. An operation system, comprising:
a first slave device coupled to a bus and comprising a first storage medium to store a first program code;
a second slave device coupled to the bus and comprising a second storage medium to store a second program code; and
an operation device comprising:
a transmission interface coupled to the bus; and
a control circuit configured to output a switching command to the first slave device at a first transmission rate and via the transmission interface, to control the first slave device to operate in a first update mode, and output update data to the first slave device at a second transmission rate and via the transmission interface, to update the first program code,
wherein:
the control circuit outputs the switching command to the second slave device at the first transmission rate and via the transmission interface, to control the second slave device to operate in a second update mode, and outputs the update data to the second slave device at the second transmission rate and via the transmission interface, to update the second program code, the control circuit receives, at the second transmission rate, a first checksum provided by the first slave device and a second checksum provided by the second slave device, responsive to each of the first checksum and the second checksum matching a preset value, the control circuit outputs the switching command to the first slave device and the second slave device at the first transmission rate and via the transmission interface, so as to control the first slave device and the second slave device to operate in a normal in the normal mode, the first slave device is operated according to the first program code, and the second slave device is operated according to the second program code.

10. The operation system according to claim 9, wherein the transmission interface is a general-purpose input-output (GPIO) interface comprising a first pin configured to receive the switching command and the update data.

11. The operation system according to claim 9, wherein the transmission interface comprises:

a general-purpose input-output (GPIO) interface comprising a first pin configured to receive the switching command; and a serial transmission interface comprising a second pin configured to receive the update data.

12. The operation system according to claim 11, wherein the serial transmission interface comprises a universal asynchronous receiver/transmitter (UART).

13. The operation system according to claim 11, wherein the serial transmission interface is an inter-integrated circuit (I2C) bus.

14. The operation system according to claim 9, wherein the bus is a digital addressable lighting interface (DALI) bus.

15. The operation system according to claim 9, further comprising:

a modulator coupled between the bus and the transmission interface, and configured to convert signals of the bus to provide the switching command and the update data to the transmission interface.

* * * * *